United States Patent [19]
Kann

[11] 3,889,978
[45] June 17, 1975

[54] REMOVABLE GOOSENECK HITCH

[76] Inventor: Jerry Albert Kann, Rte. 2, Box 470, Roswell, N. Mex. 88201

[22] Filed: May 31, 1974

[21] Appl. No.: 474,906

[52] U.S. Cl. .......................... 280/415 B; 280/423 R
[51] Int. Cl. ............................................ B62d 53/04
[58] Field of Search ........ 280/415 B, 415 R, 423 R, 280/423 B

[56] References Cited
UNITED STATES PATENTS

| | | | |
|---|---|---|---|
| 2,628,106 | 2/1953 | Sturwold | 280/423 B X |
| 2,635,892 | 4/1953 | Shutter | 280/423 R X |
| 3,348,859 | 10/1967 | Melbye | 280/415 R |
| 3,796,443 | 3/1974 | Crutchfield | 280/423 B X |
| 3,796,444 | 3/1974 | Hixon | 280/423 R X |
| 3,810,661 | 5/1974 | Lowrance | 280/415 B |
| 3,815,936 | 6/1974 | Oaks | 280/415 B |

Primary Examiner—Leo Friaglia
Attorney, Agent, or Firm—Robert G. McMorrow

[57] ABSTRACT

Hitch means for connection of a towed vehicle to a towing vehicle wherein the towed vehicle has a forward tongue with a first socket, and the gooseneck assembly includes body portion arms embracing the tongue and clamped releasably thereto. The body portion arms have a plate with a first ball on which the first socket is maintained, and the gooseneck carries a second socket engaged on a second ball on the towing vehicle.

The gooseneck is of adjustable height, and has a tie rod extending to the clamp for stability.

3 Claims, 6 Drawing Figures

REMOVABLE GOOSENECK HITCH

BACKGROUND OF THE INVENTION

1. Field of the Invention

This invention pertains to vehicle hitches and particularly to that category of hitch popularly referred to as of the gooseneck variety.

2. Description of the Prior Art

Gooseneck hitches generally have long been recognized as providing superior tow characteristics inasmuch as they avoid simple point to point connection and favorably alter the relationship between the respective towed and towing vehicles. It has also been recognized that removability is a desirable characteristic of such hitches. Representative prior patents in the field are as follows:

| Patent No. | Patentee | Issue Date |
| --- | --- | --- |
| 2,613,945 | Talbert | Oct. 14, 1952 |
| 2,628,106 | Sturwold | Feb. 10, 1953 |
| 2,635,892 | Shutter | April 21, 1953 |
| 2,844,265 | Clark | July 22, 1958 |
| 3,027,030 | Duffy | March 27, 1962 |
| 3,527,476 | Winckler | Sept. 8, 1970 |
| 3,698,740 | Chisholm et al | Oct. 17, 1972 |
| 3,733,089 | Goecke et al | May 15, 1973 |

SUMMARY OF THE INVENTION

The present invention provides a detachable gooseneck hitch which has adjustment features readily adapting it to employment in conjunction with previously existing tow system components. The unit is attached to present drawbar means via both a ball and socket joint and a clamp system, both of which are readily removable whereby the utility of the present tow system is unaffected by the use of this gooseneck hitch.

The present invention alters the tow characteristics by placing the point of connection of the tow system forwardly of the rear end of the towing vehicle thus avoiding undesirable sway characteristics and increasing the control over the towed vehicle which exists during movement.

The present invention does not substantially modify the towing vehicle, and the components are readily removable, thereby obviating the necessity for substantial modification of the towing vehicle. Moreover, the normal tow system characteristics are not affected whereby the towed vehicle may be adapted for use with other towing systems.

Other and further objects and advantages of the invention will become apparent to those skilled in the art from a consideration of the following specification when read in conjunction with the annexed drawings.

DESCRIPTION OF THE PREFERRED EMBODIMENT

Figure 1:
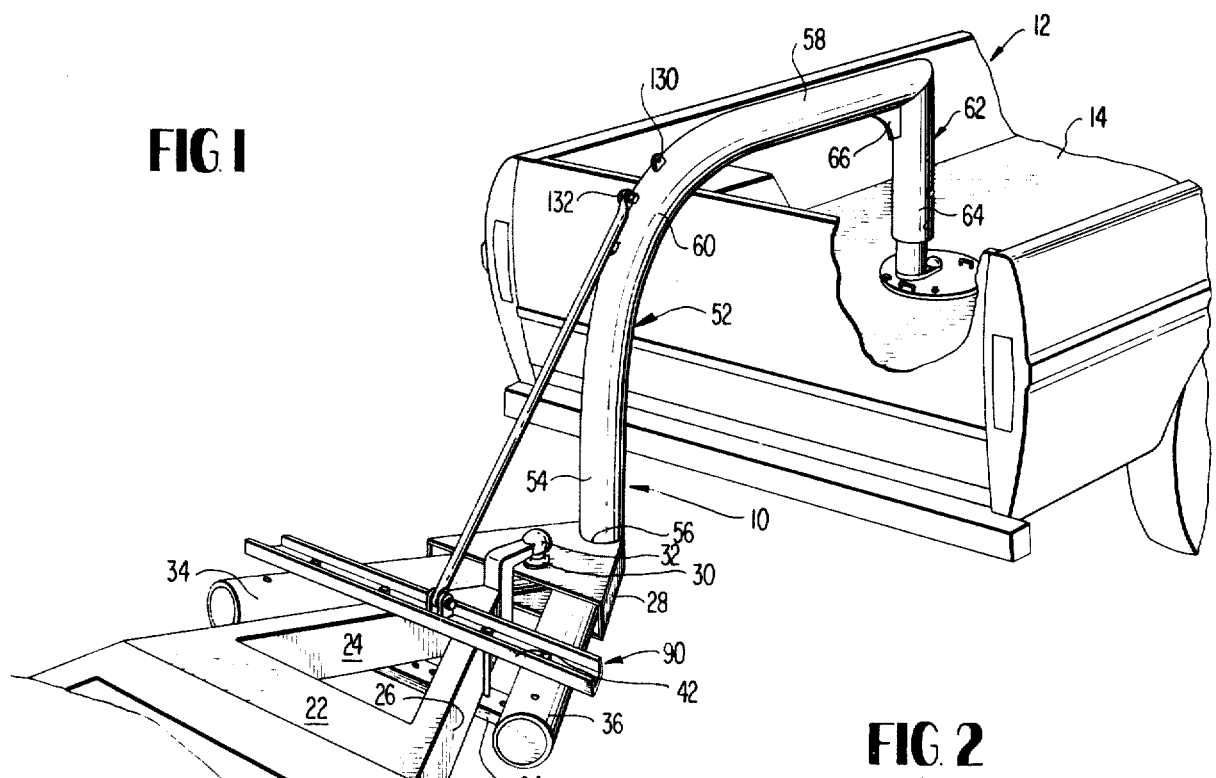
FIG. 1 is a perspective view showing the system hereof in the environment of a towed and a towing vehicle.
Figure 2:
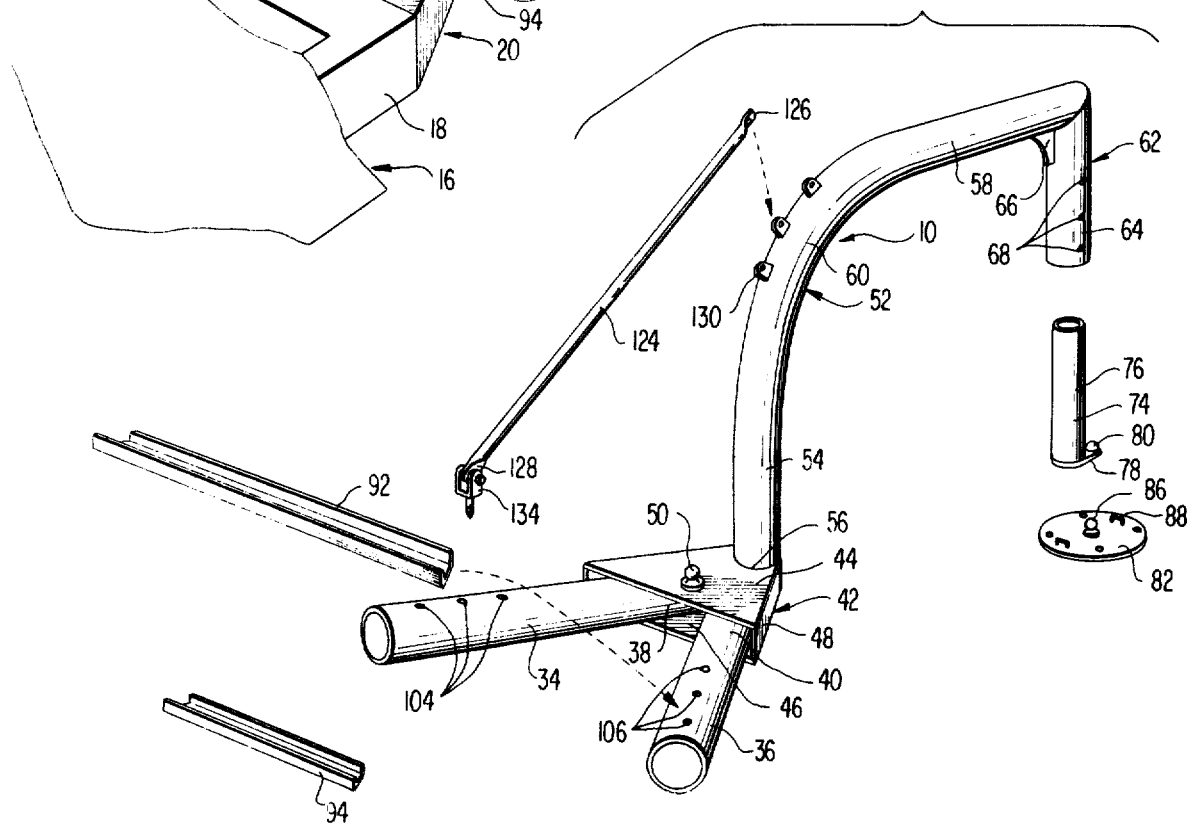
FIG. 2 is a disassembled perspective view of the gooseneck hitch components.
Figure 3:
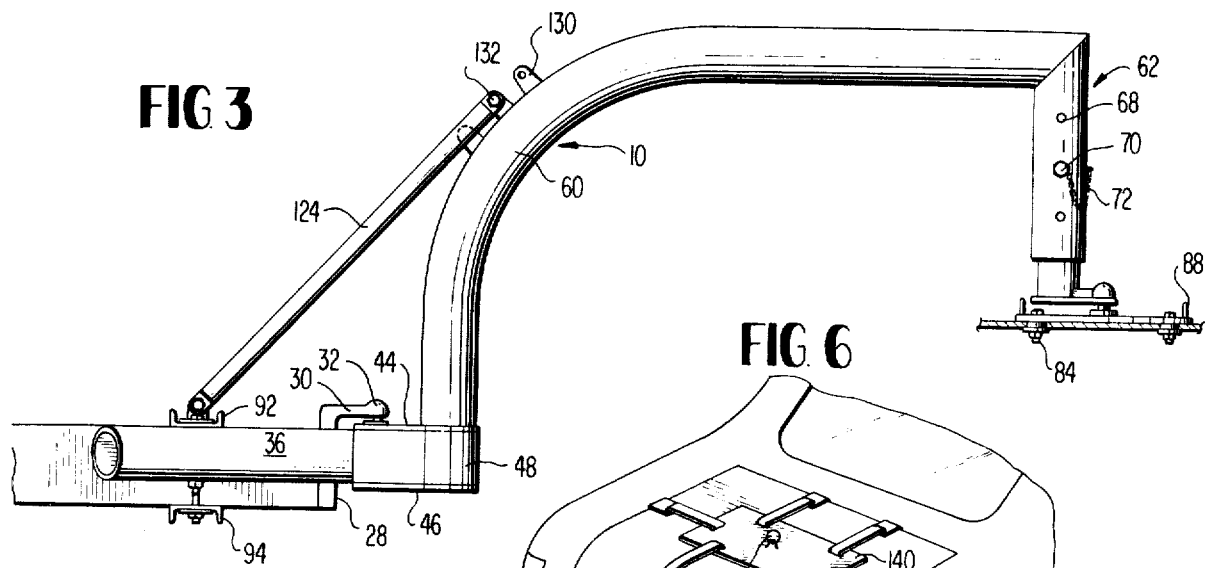
FIG. 3 is a side elevational view of the components.

Referring to the drawings in more detail, the removable gooseneck hitch hereof is therein generally identified by reference character 10. The hitch 10 is shown as applied illustratively to a towing vehicle 12 such as a pickup truck having a bed 14 and to a towed vehicle 16 such as a trailer having a frame 18. Extending forwardly from the frame 18 of the trailer is a projecting tongue assembly 20 of generally triangular outline form. The tongue 20 includes a base 22 fixedly secured to the frame, and converging sides 24, 26. A vertical front bar 28 is mounted forwardly of the sides 24, 26, and has an horizontal extension 30 with a first socket member 32. The socket 32 is of conventional design as used in trailer hitch constructions.

The gooseneck hitch 10 comprises a pair of hitch body portion arms 34, 36 of elongated tubular construction, and preferably formed of durable metallic stock. These arms are angularly related to one another and diverge outwardly from their respective adjacent forward end portions 38 and 40. Mounting plate means 42 fixedly secure the body portion arms together at said forward ends. The mounting plate means comprise a housing of substantially triangular configuration having a top plate 44, a bottom plate 46, and a connecting side wall 48. The first ball member 50, associated with the first socket 32 when in use, projects upwardly from the top plate 44.

A main structural component of the assembly comprises an elongated gooseneck member 52 of curvilinear form, having a first substantially vertical section 54 connected at its outer end 56 to the top plate 44. A second substantially horizontal section 58 of the gooseneck is joined to the first section at a curve portion 60. A column assembly 62 includes a tubular vertical member 64 fixedly secured to the horizontal section 58 of the gooseneck. A gusset plate 66 rigidifies this connection. The vertical member 64 has a series of vertically spaced openings 68 formed therein, and carries a cross bolt 70 captively maintained by a link chain 72. A tubular slide member 74 is of reduced diameter relative to the vertical member 64 and is slidably mounted therein. The slide member has a cross opening 76 of sufficient dimension to receive the bolt 70, and selective height adjustment is made possible by alignment of the opening 76 with a selected opening 68, the bolt being extended through the aligned openings to lock the slide member in place. A foot plate 78 on the slide member extends forwardly and has a second socket member 80 thereon.

A plate 82 is secured by changeable fastening means 84 to the truck bed 14. The plate carries an upwardly projecting second ball 86. The means for mounting of the ball on the truck is, of course, variable. In order to facilitate removal of the plate and ball when not in use, handles 88 are provided on the plate. The second socket 80 engages the second ball 86 in conventional hitch fashion.

Figure 5:
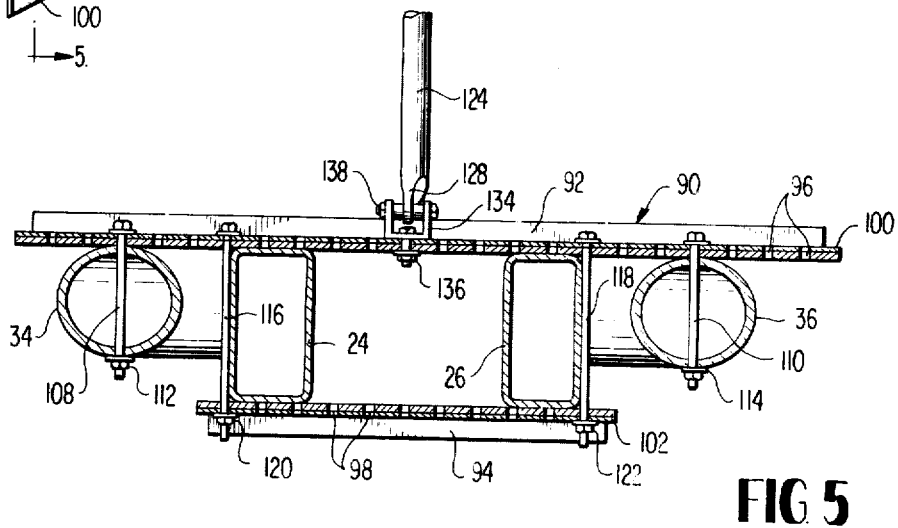
FIG. 5 is an enlarged cross sectional view taken on line 5—5 of FIG. 4, looking in the direction of the arrows.

Clamp means 90 extends across the body portion arms to secure the immobile relationship of the arms relative to the tongue. The clamp means includes an elongated upper cross bar 92 and a shorter lower cross bar 94. The cross bars are of channel form, and each has a series of apertures 96, 98, respectively, formed in the bight portion thereof. It will be observed in FIG. 5 that each of the bight portions has a lining 100, 102, formed preferably of spring steel or the like to avoid wear, and that the respective apertures also extend through these linings. The body portion arms 34 and 36 also each have a series of holes 104, 106 formed therein. Referring further to FIG. 5, it is there shown that vertical bolts 108, 110 are provided. Upon selection of the location of the upper cross bar, openings 96 therein are aligned with a selected pair of holes 108 and 110 in the body portion arms. The bolts 108 and 110 are then extended through these aligned openings and holes and locked in place by nuts 112, 114. By reason of the dimension of spacing of the apertures 96, a pair thereof are then located closely adjacent the outsides of the tongue sides 24 and 26. A further pair of elongated bolts 116 and 118 are extended through the last named apertures and through a pair of aligned apertures 98 of the lower cross bar 94. These are then locked in place by nuts 120, 122.

In order to stabilize the assembly, a tie rod 124 is provided. The rod has flattened ends 126, 128. At the curved portion 60 of the gooseneck, a series of spaced apart, outwardly projecting connection ears 130 are provided. The end 126 is apertured, as are the connection ears, and a changeable fastener assembly 132 is used to pivotally connect the tie rod end thereto. The selection of the connection ear corresponds to the height of the column assembly 62. A clevis 134 is secured by a bolt and nut 136 extending through a central opening 96 of the upper cross bar 92. This is pivotally connected to the end 128 of the tie rod by a cross link assembly 138.

Figure 6:
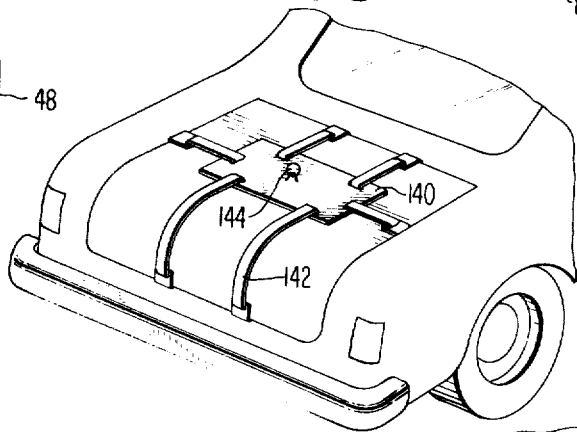
FIG. 6 is a perspective view showing a modified mounting means.
Figure 4:
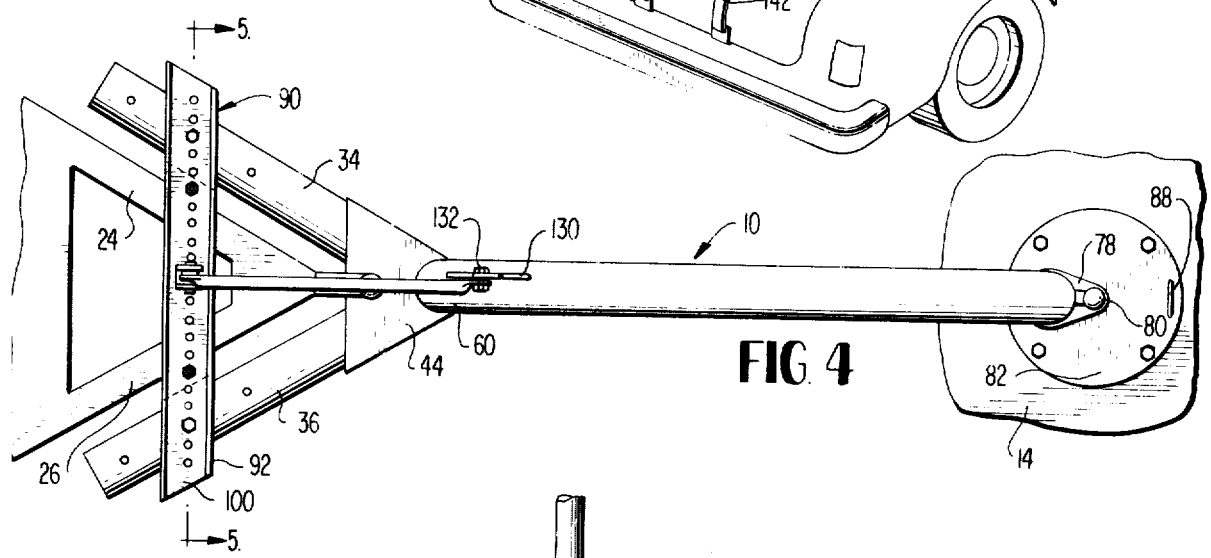
FIG. 4 is a top plan view thereof.

From the foregoing, the manner of use of this assembly is believed to be apparent. The connection of the gooseneck to the towed vehicle 16 is accomplished by first engaging the first socket 32 on the first ball 50. The correct towing height of the assembly is then set through adjustment of the column assembly 62 and the second socket 80 is positioned on the second ball member 86. The clamping means then are employed to lock the assembly in place and the tie rod is suitably positioned. The unit may also be attached to a vehicle such as a passenger car as shown in FIG. 6. Here, a rectangular mounting plate 140 is secured by a series of straps 142 to the trunk lid in a desired orientation. A ball member 144 projects upwardly from the plate. The manner of use of this arrangement is similar to that described above.

Among possible alternative structures is a fully equivalent form wherein the gooseneck 52 is connected directly to the arms 34 and 36, the housing being omitted. Also, the structural units may be round as shown in section, or of other conventional shapes, and may be of any suitable metal, including aluminum.

I claim:

1. Hitch means for interconnection of a towed vehicle and a towing vehicle comprising:
    forwardly projecting tongue means on the towed vehicle, said tongue means having a first socket member thereon;
    means securing a vertically extending second ball member on the towing vehicle;
    a pair of hitch body portion arms, each having a forward end and being adjacent to one another at said forward ends;
    mounting plate means fixedly secured over said forward ends of said body portion arms, the mounting plate means having a vertically extending first ball member thereon;
    clamp means extending across said body portion arms and said tongue means and clampingly engaged thereagainst, the first socket member being engaged over the first ball member;
    a gooseneck having a first upward portion extending from the mounting plate means and a second forwardly extending portion;
    a vertical column assembly on the second portion of the gooseneck, said column assembly having a second socket member thereon;
    the second socket member being engaged with the second ball member;
    the tie rod means extending between the gooseneck and the clamp means;
    the body portion arms having a series of substantially vertical openings therein;
    the clamp means comprising upper and lower cross bars with a series of spaced holes formed therein; and
    changeable fasteners extending through the holes in the upper cross bar and the openings in the body portion arms, and through aligned holes in the upper and lower cross bars adjacent the tongue means.

2. Hitch means for interconnection of a towed vehicle and a towing vehicle comprising:
    forwardly projecting tongue means on the towed vehicle, said tongue means having a first socket member thereon;
    means securing a vertically extending second ball member on the towing vehicle;
    a pair of hitch body portion arms, each having a forward end and being adjacent to one another at said forward ends;
    mounting plate means fixedly secured over said forward ends of said body portion arms, the mounting plate means having a vertically extending first ball member thereon;
    clamp means extending across said body portion arms and said tongue means and clampingly engaged thereagainst, the first socket member being engaged over the first ball member;
    a gooseneck having a first upward portion extending from the mounting plate means and a second forwardly extending portion;
    a vertical column assembly on the second portion of the gooseneck, said column assembly having a second socket member thereon;
    the second socket member being engaged with the second ball member;
    the tie rod means extending between the gooseneck and the clamp means;
    said means securing said second ball member comprising a plate having a series of straps thereon; and
    the straps being secured to the trunk of an automotive vehicle.

3. Hitch means for interconnection of a towed vehicle and a towing vehicle comprising:
    forwardly projecting tongue means on the towed vehicle, said tongue means having a first socket member thereon;
    means securing a vertically extending second ball member on the towing vehicle;

a pair of hitch body portion arms, each having a forward end and being adjacent to one another at said forward ends;

mounting plate means fixedly secured over said forward ends of said body portion arms, the mounting plate means having a vertically extending first ball member thereon;

longitudinally adjustable clamp means extending across said body portion arms and said tongue means and clampingly engaged thereagainst, the first socket member being engaged over the first ball member;

a gooseneck having a first upward portion extending from the mounting plate means and a second forwardly extending portion;

a vertically adjustable column assembly on the second portion of the gooseneck, said column assembly having a second socket member thereon;

the second socket member being engaged with the second ball member; and the tie rod means extending between the gooseneck and the clamp means and being pivotally connected to the clamp means.

* * * * *